United States Patent [19]

McCullough

[11] Patent Number: 5,667,870
[45] Date of Patent: Sep. 16, 1997

[54] PLASTIC ARTICLE WITH INTERRUPTED INTERIOR THREADS FOR SECURING A THREADED HEAT SINK TO A HEAT GENERATING MEMBER

[75] Inventor: Kevin Albert McCullough, Warwick, R.I.

[73] Assignee: Chip Coolers, Inc., Warwick, R.I.

[21] Appl. No.: 505,879

[22] Filed: Jul. 24, 1995

[51] Int. Cl.[6] ........................................... H01L 23/40
[52] U.S. Cl. .......................... 428/131; 428/35.7; 428/99; 428/119; 411/437; 257/717; 257/706; 257/718; 257/719; 257/727
[58] Field of Search ........................ 428/131, 35.7, 428/99, 119; 411/437; 257/717, 706, 718, 719, 727

[56] References Cited

U.S. PATENT DOCUMENTS

| | | | |
|---|---|---|---|
| 1,069,451 | 8/1913 | Marston | 411/437 |
| 3,433,119 | 3/1969 | Ballantyne et al. | 411/437 |
| 3,482,814 | 12/1969 | Hedgewick | 249/67 |
| 3,618,170 | 11/1971 | Owens | 18/30 |
| 3,904,165 | 9/1975 | Den Boer | 249/67 |
| 4,019,711 | 4/1977 | Altenhof et al. | 249/59 |
| 4,188,178 | 2/1980 | Anscher | 425/469 |
| 4,299,520 | 11/1981 | Iwata | 411/437 |
| 4,558,494 | 12/1985 | Kraus | 24/297 |
| 4,721,220 | 1/1988 | Northup | 215/307 |
| 4,938,679 | 7/1990 | Pietrorazio | 425/437 |
| 5,313,099 | 5/1994 | Tata et al. | 257/717 |
| 5,397,919 | 3/1995 | Tata et al. | 257/717 |

*Primary Examiner*—William Watkins
*Attorney, Agent, or Firm*—Barlow & Barlow, Ltd.

[57] ABSTRACT

A article with interior interrupted threads and a mold apparatus for manufacturing the same is provided. The molded article includes an aperture positioned completely therethrough as defined by an inner wall. The inner aperture wall carries a series of thread segments positioned about the periphery of the inner wall to form an interrupted helical thread line. The thread segments create a female threaded aperture through the molded article for receipt of a male threaded member therein. The mold apparatus includes an upper half and a lower half. The upper half carries a cylindrical wall which is notched with its upper edge being beveled outwardly. The bottom half also carries a cylindrical wall which is notched as well as beveled outwardly. The two cylindrical wall top edges meet together with respective beveled edges of each notched portion of the cylindrical walls being positioned adjacent one another to form a series of thread matrices for molding thread segments on the inner wall of the aperture through the molded article.

3 Claims, 6 Drawing Sheets

PLASTIC ARTICLE WITH INTERRUPTED INTERIOR THREADS FOR SECURING A THREADED HEAT SINK TO A HEAT GENERATING MEMBER

BACKGROUND OF THE INVENTION

The present invention relates generally to an article having interrupted threads and a mold for manufacturing the same. More specifically, the present invention relates to a mold apparatus which is capable of manufacturing an article having a female threaded aperture for receiving male threaded members.

In the field of threaded articles, namely, articles with female threaded apertures for receiving male threaded members, it has been well known that such an article can be created by first molding the article leaving an aperture completely therethrough. Next, to create the female threads on the inner wall of the aperture through the article, it has been well known to unscrew a mandrel through the aperture, preferably when the molded article is still soft, to create the internal female threads by tooling. This well-known process requires the multiple steps of molding the piece and then unscrewing a mandrel to form a continuous female thread on the inner wall of an aperture through the article. This is the only known process for creating internal female threads where an aperture extends completely through an article. For example, nuts and screw hole apertures are formed in this fashion.

To avoid the use of a mandrel and a separate tooling step for creating threads, it has been well known to employ a collapsible core which includes a set of fingers with thread matrices thereon to form a thread pattern in the molding process. Each of these collapsible core-type molding devices, due to their construction, only have application in forming internal threads on various types of closures, such as plastic bottle caps, and the like. These molded articles do not have apertures positioned completely therethrough.

For example, U.S. Pat. No. 4,938,679, issued to Pietrorazio, incorporated herein by reference, discloses a collapsible core for molding closures having interrupted interior threads. In particular, this patent teaches the employment of a collapsible core with a number of fingers having thread matrices thereon which spread apart during the molding process and then collapse to permit removal of the completed molded bottle cap. The resultant thread pattern is a number of groups, depending on the number of collapsible fingers, of multiple thread segments vertically aligned with one another. Large gaps remain between each of the groups to permit the fingers to collapse during the removal process. In addition, U.S. Pat. No. 3,618,170, issued to Owens, incorporated herein by reference, discloses an apparatus for molding plastic closures which includes a pair of collapsible fingers for forming two groups of internal threads within the closure article. Large smooth portions remain on the inner wall between the two groups of thread segments. In each of the foregoing collapsible core-type molding apparatuses, a large number of moving parts are required to enable the collapsible core to open and close. Such apparatuses experience severe wear since they repeatedly open and close for each molded cap produced.

The foregoing known prior art apparatuses and methods for producing internal threads have serious drawbacks in certain applications. In particular, referring first to the method of unscrewing a mandrel through an aperture to create the threads by tooling, only certain plastics are capable of being manipulated in this manner to create threads. There are certain high temperature and heat-resistant plastics which are not well suited for injection molding and, in particular, being subject to mandrel tooling for the creation of threads in an aperture. In addition, a quality thread engagement is critical in certain applications and environments such as high heat situations. As a result, the groups of threads created by the collapsible core-type devices are unacceptable for creating threads for use in high temperature environments due to the large gaps present between each of the groups. High temperatures will cause the article material to buckle, thus requiring better thread coverage about the periphery of the threaded aperture.

As a result of the disadvantages found in the prior art devices, there is a demand for the ability to create internal threads on an aperture wall of an article made of any material required by the manufacturer. It is also desirable to manufacture a threaded article which is less susceptible to defects due to wear and requires a mold apparatus which has few moving parts and is easy to maintain.

SUMMARY OF THE INVENTION

The present invention preserves the advantages of prior art threaded articles and mold devices used for manufacturing such threaded articles. In addition, it provides new advantages not found in currently available mold apparatuses, and overcomes many disadvantages of such currently available apparatuses.

The invention is generally directed to a novel and unique article which includes an aperture, which is disposed completely through the article, having an inner wall with a series of thread segments thereon. The mold apparatus of the present invention enables the manufacture of the internally threaded article of the present invention in a single step, with no moving parts, and without the need for thread tooling by a mandrel.

The mold apparatus of the preferred embodiment of the present invention includes two primary members. A first mold member includes a base with a cavity therein and a cylindrical wall disposed on the floor of the cavity. The cylindrical wall includes a notched upper portion with a series of peaks and valleys where each portion of the cylindrical wall, at the peaks and valleys, has a different height as measured from the cavity floor to a top edge at the cylindrical wall at each peak and valley. The cylindrical wall is beveled outwardly at the top edge of the cylindrical wall.

The second mold member also includes a base and preferably includes the cylindrical wall disposed thereon. The cylindrical wall of the second mold member also includes a notched upper portion with a series of peaks and valleys therein. The cylindrical wall has a different height, measured from the base to the top edge of the cylindrical wall, at each peak and valley. The cylindrical wall on the second mold member is beveled outwardly at the top edge of the cylindrical wall. The first and second mold members are matable with one another where the respective top edges of the cylindrical walls provide a complementary mate with one another, thereby creating a series of shutoff surfaces with the respective edges of the cylindrical walls. As a result of the beveled surfaces and shutoff surfaces, a number of thread segment matrices are formed at different heights about the periphery of the mated cylindrical walls.

In operation, the first mold member and the second mold member are mated together with their respective top edges in communication with one another, as described above. Article forming material, such as molten plastic, is introduced into the mold via an inlet port. When the molten material has hardened, the first mold member and the second mold member are separated from one another, and the completed molded article is ejected from the mold.

It is, therefore, an object of the present invention to provide an injection molded article having a threaded aperture for receiving male threaded members therein.

Another object of the present invention is to provide an article having a threaded aperture which can be formed of any desired material and still retain high integrity of the threaded portion of the article.

It is a further object of the present invention to provide a mold apparatus for manufacturing an article having a threaded aperture.

It is yet a further object of the present invention to provide a mold apparatus for creating an article with internal threads that has no moving parts.

It is another object of the present invention to provide a mold apparatus for creating an article with internal threads which does not require specific thread tooling in addition to the step of molding the article.

An additional object of the present invention is to provide a mold apparatus which simultaneously molds an article and a threaded aperture which extends completely through the article.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
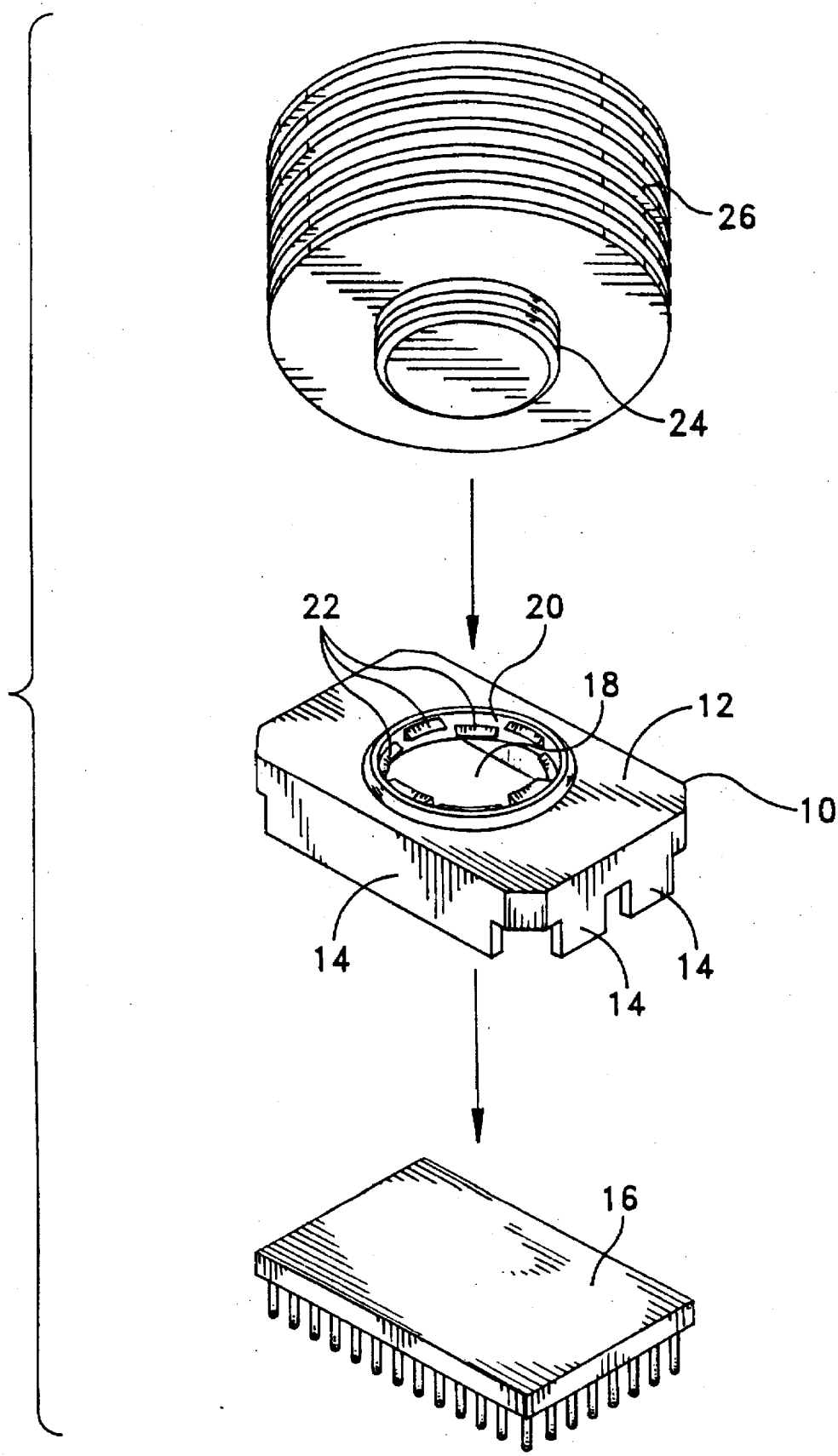
FIG. 1 is an exploded perspective view of an article made in accordance with the present invention being used in a semiconductor device cooling environment.

Referring to FIG. 1, an exploded perspective view of an application of the present invention is shown. FIG. 1 illustrates an example of the use of interrupted interior threads on an article for receiving a male threaded member. More specifically, article 10 includes a planar body 12 with an aperture 18 completely therethrough. Aperture 18 is defined by inner wall 20 which carries a series of thread segments 22 thereon. Aperture 18 and thread segments 22 provide a female threaded aperture for receiving male threaded shank 24.

As illustrated in the figures, article 10, which is manufactured in accordance with the present invention is shown to be an adapter for engaging with a semiconductor device, as seen in FIG. 1, and to secure a heatsink member 26 into communication with the semiconductor device 16. Such an application of the present invention is one example of how the present invention can be employed. In addition, other applications, where a female threaded aperture is required, may employ the present invention.

Figure 2:
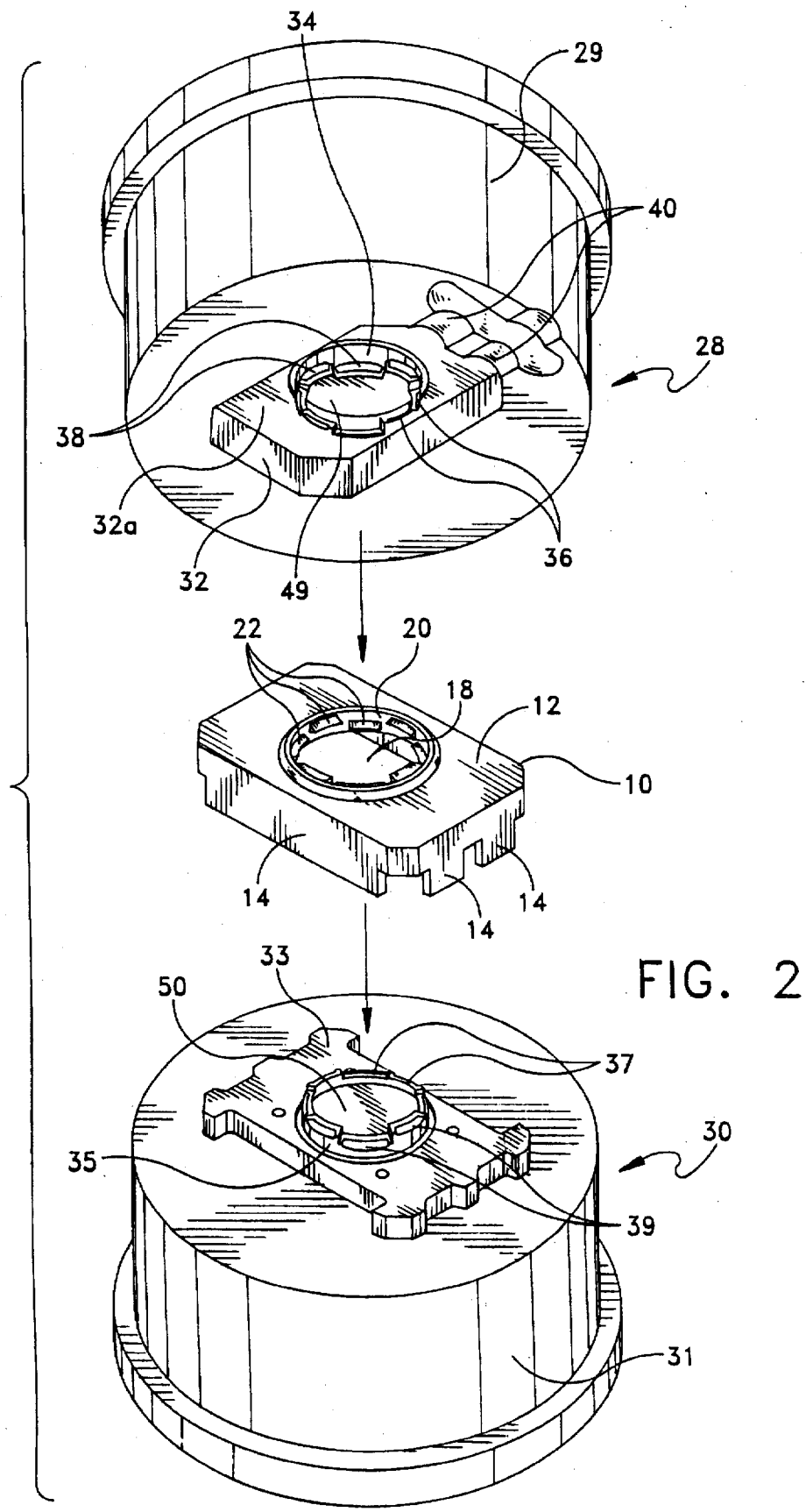
FIG. 2 is an exploded cross-sectional view of the mold apparatus of the present invention and an article molded therefrom.

Referring to FIG. 2, the upper mold assembly 28 and lower mold assembly 30 are shown in an exploded perspective view along with molded article 10. Upper mold assembly 28 and lower mold assembly 30 meet together to permit the molding of molded article 10 therein. In FIG. 2, upper mold assembly 28 includes a top base 29 preferably made of cast aluminum. Top base 29 may also be made of any other appropriate injection mold material. For example, the mold material may be LNP VERTON UF-700-10-HS (PPA 50% long fiber) for use in high temperature heatsink applications.

Top base 29 includes cavity 32 as well as a number of inlet ports for receiving liquid mold material into cavity 32. Positioned on cavity floor 32a is a top cylindrical wall 34 with a notched upper edge 36 forming a series of peaks and valleys. The upper edge 36 of each peak and valley portion of cylindrical wall 34 includes an outwardly beveled surface 38.

Bottom base 31 of lower mold assembly 30 includes a plate 33 which engages with cavity 32 to form the desired shape of molded article 10 with downwardly depending legs 14. Positioned on plate 33 is bottom cylindrical wall 35 which includes a notched upper edge 37 forming a series of peaks and valleys. Each of the peaks and valleys at notched upper edge 37 include an outwardly extending beveled surface 39.

Figure 3:
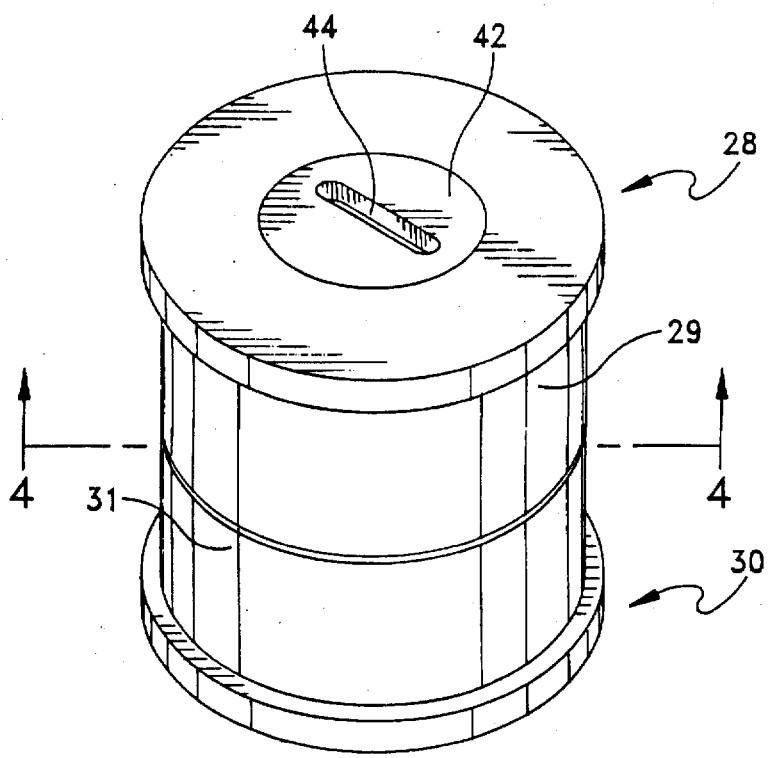
FIG. 3 is a perspective view of the mold apparatus of the present invention with top mold half and bottom mold half mated together.
Figure 4:
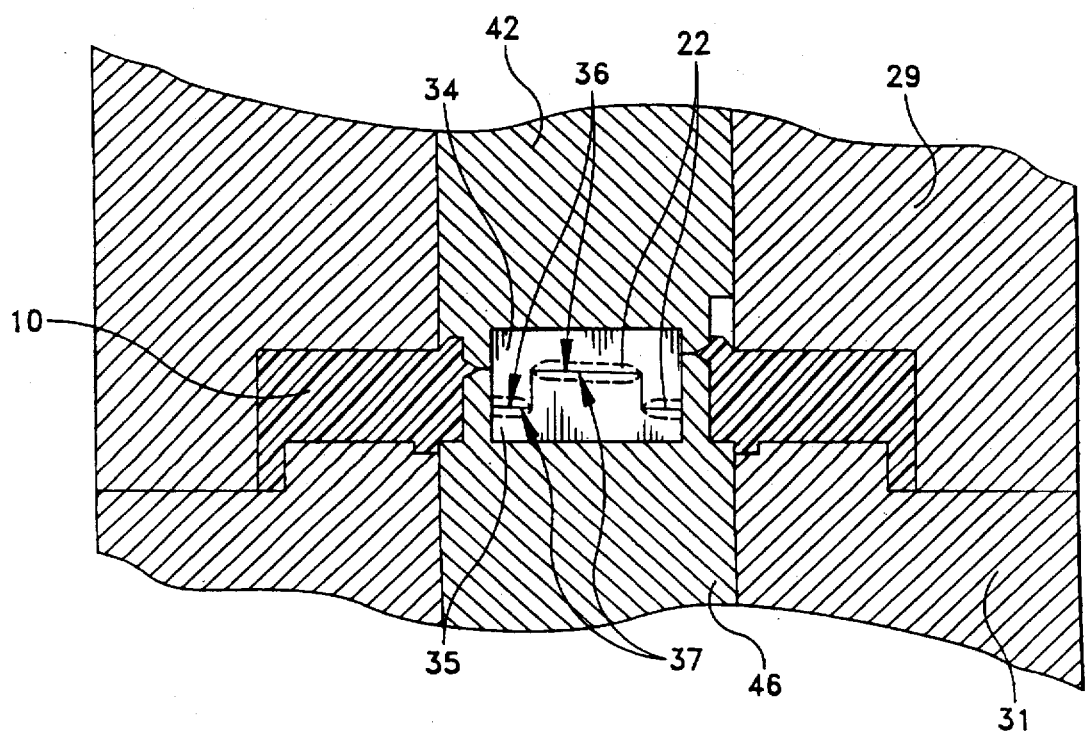
FIG. 4 is a cross-sectional view through the line 4—4 of FIG. 3.

FIG. 3 illustrates a perspective view of upper mold assembly 28 and lower mold assembly 30 mated together with top base 29 and bottom base 31 in communication with one another. Referring to FIGS. 3 and 4, a top rotatable and acuatable core 42 is preferably provided to introduce top cylindrical wall 34 into cavity 32. FIG. 4, which is a cross-sectional view through the line 4—4 of FIG. 3, illustrates top cylindrical 34 with notched upper edge 36 within the region of cavity 32. Similarly, bottom base 31 includes bottom rotatable and actuatable core 46 for introducing bottom cylindrical wall 35 into cavity 32. Slot 44 of top core 42 enables the core 42 to be rotated, thus rotating top cylindrical wall 34, as required, to be in a complimentary mate with bottom cylindrical wall 35. In addition, bottom core 46 may also be rotatable to facilitate the alignment and mating of respective notches of upper cylindrical wall 34 and bottom cylindrical wall 35. The ability for cores 42 and 46 to actuate in and out facilitate ejection of a completed molded article from the mold. While upper mold assembly 28 and lower mold assembly 30 preferably include rotatable and actuatable cores 42 and 46, respectively, such assemblies 28 and 30 may, in the alternative, be a single unitary and solid member with no moving parts.

As can be seen in FIG. 4, notched upper surface 36 of top cylindrical wall 34 complimentarily mates with notched upper edge 37 of bottom cylindrical wall 35. Surfaces 36 and 37 mate together to position respective beveled surfaces 38 and 39 proximal to one another to form a series of thread segment matrices. Essentially, as best seen in FIG. 2, beveled surfaces 38 provide the upper portions of each thread segment 22 while beveled surfaces 39 provide the mold portion for the lower portions of each thread segments 22.

As in FIG. 2, due to the complimentary mating of top cylindrical wall 34 and bottom cylindrical wall 35, interior cylindrical wall region 49 and interior wall region 50 are devoid of any mold material during the molding process. As a result, aperture 18 is formed while the thread segment matrices, formed by beveled surfaces 38 and 39, are created on inner wall 20 of aperture 18.

It should be understood that the specific shape and configuration of upper mold assembly 28 and lower mold assembly 30 may be modified to generate a molded article 10 in accordance with the manufacturer's specifications. For example, cavity 32 and plate 33 may be modified to eliminate downwardly extending legs 14 depending on the desired molded article 10.

Figure 5:
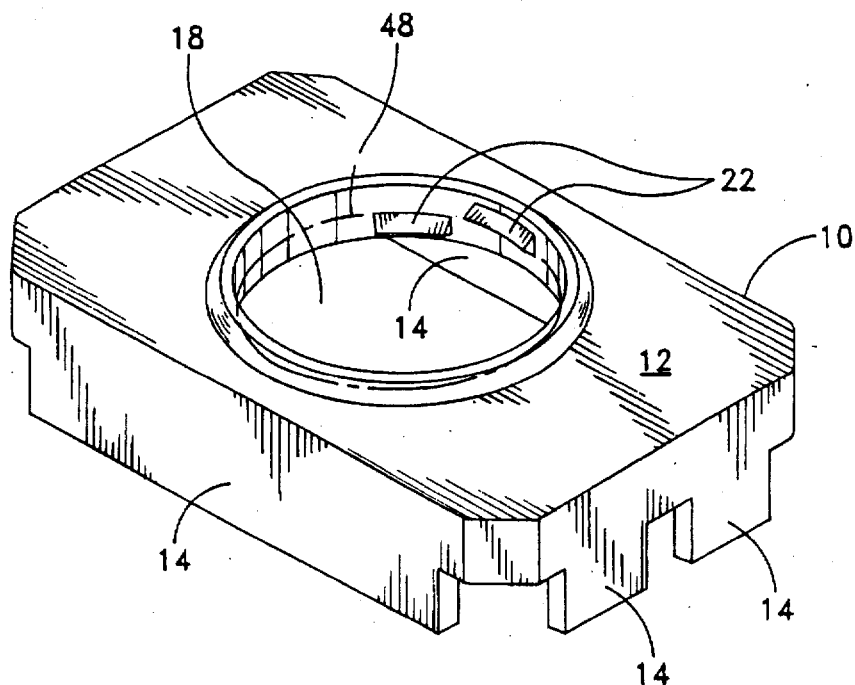
FIG. 5 is an article manufactured in accordance with the present invention having a threaded aperture.
Figure 6:
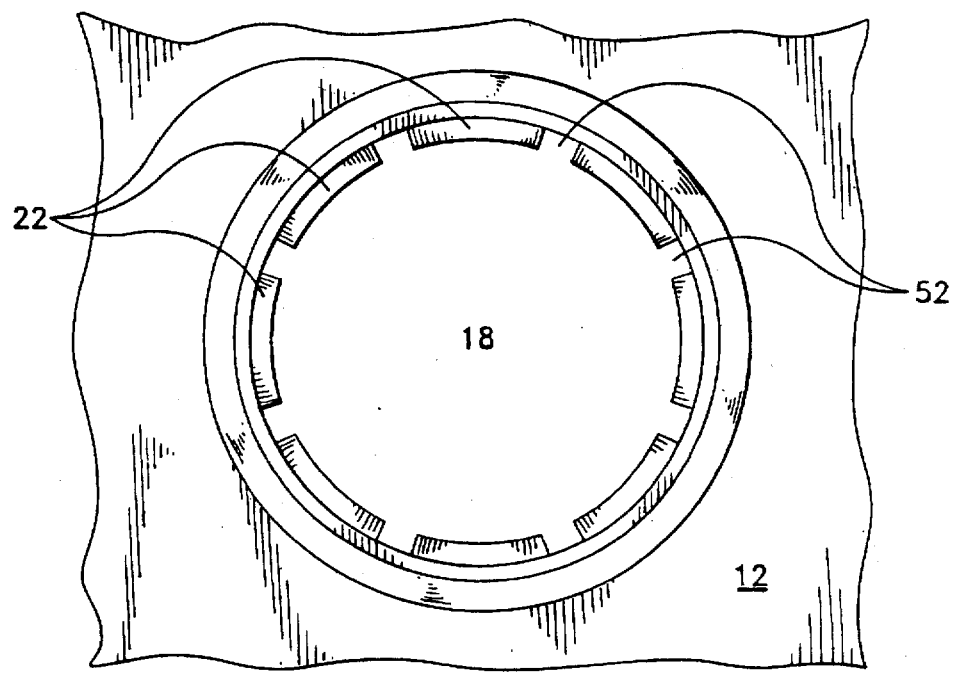
FIG. 6 is a top view of the article shown in FIG. 5.

Turning now to FIG. 5, a perspective view of an article 10 molded in accordance with the present invention is shown. Molded article 10 includes planar surface 12 and aperture 18 positioned completely therethrough. Legs 14 are also provided due to the particular application of the present invention in a heatsink apparatus. Still referring to FIG. 5, thread segments 22 form a helical line 48 representing the desired helical thread line for receiving a male threaded member. As can be understood, the particular notched surfaces 36 and 37 of cylindrical walls 34 and 35, respectively, may be modified to create any desirable helical thread pattern. Referring now to FIG. 6, a top view of molded article 10, with thread segments 22 disposed thereon, is shown. Aperture 18 is, therefore, prepared to receive a male threaded member in a fashion similar to a common continuous helical thread about the periphery of an aperture. Thread segments 22 are preferably spaced apart from one another with gaps 52 disposed therebetween. Such gaps 52 facilitate the molding process and ensure the integrity of each thread segment 22 as a separate molded portion. Therefore, the size, shape, configuration and helical pattern of thread segments 22 may be modified in accordance with the manufacturer's specifications.

Figure 7:
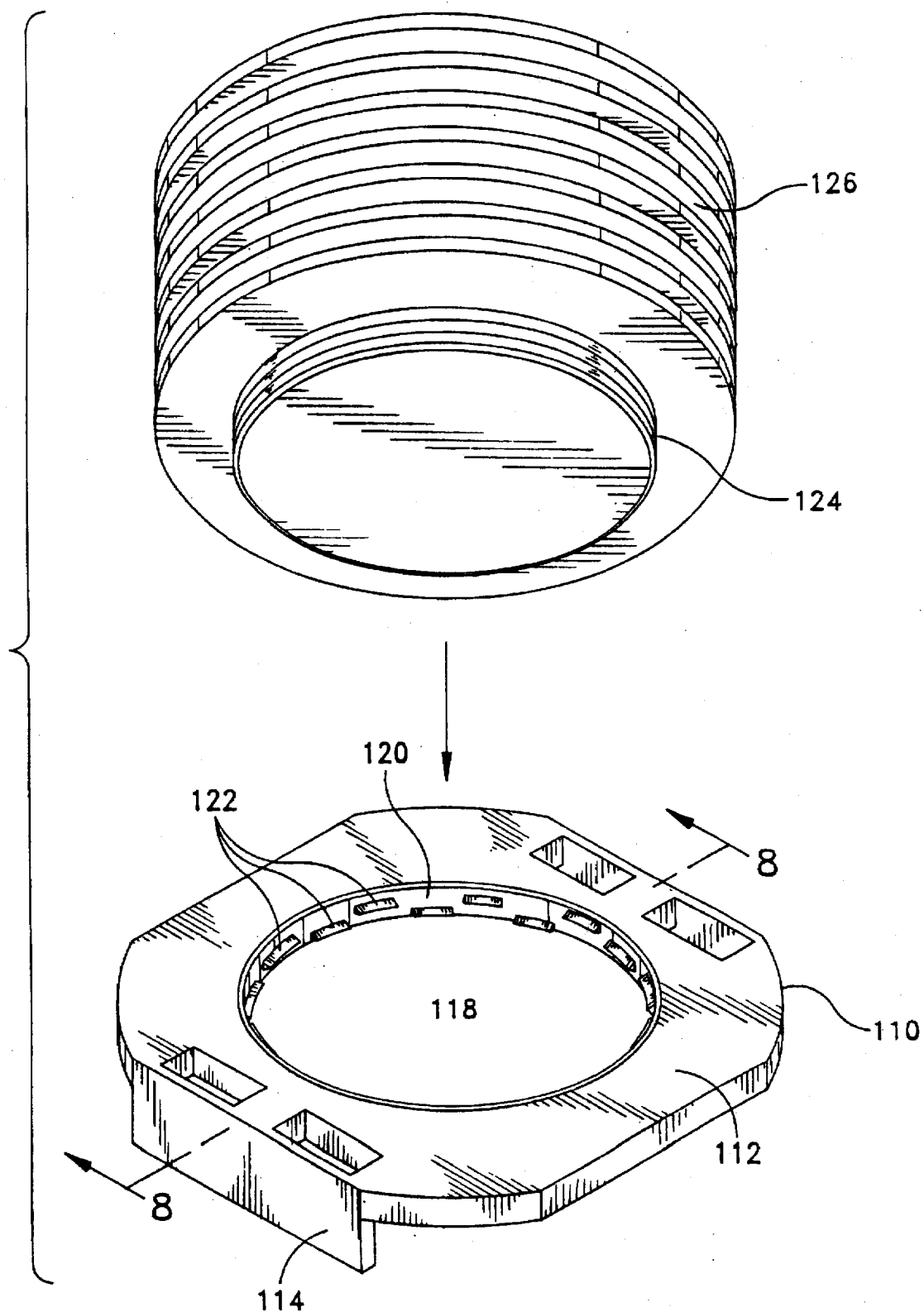
FIG. 7 is an exploded perspective view of an alternative embodiment of an article produced in accordance with the present invention.
Figure 8:
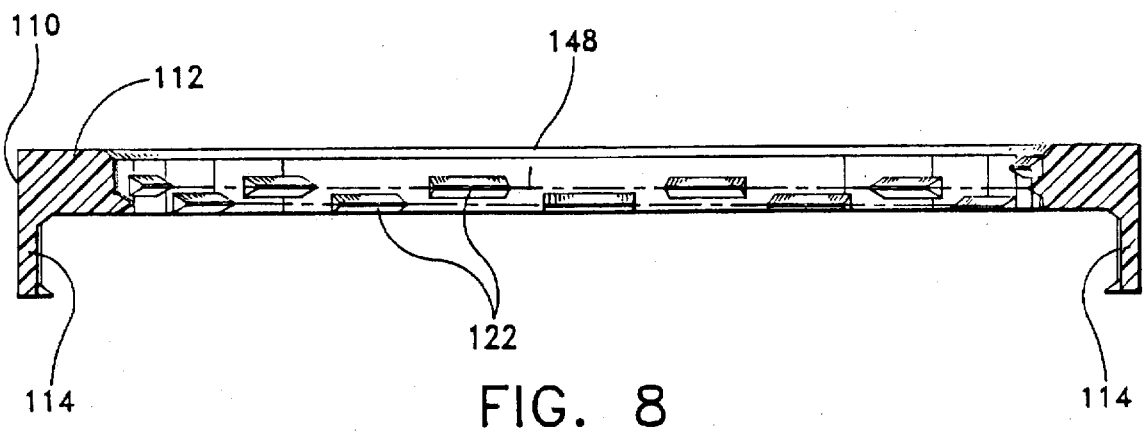
FIG. 8 is a cross-sectional view through the line 8—8 of FIG. 7.
Figure 9:
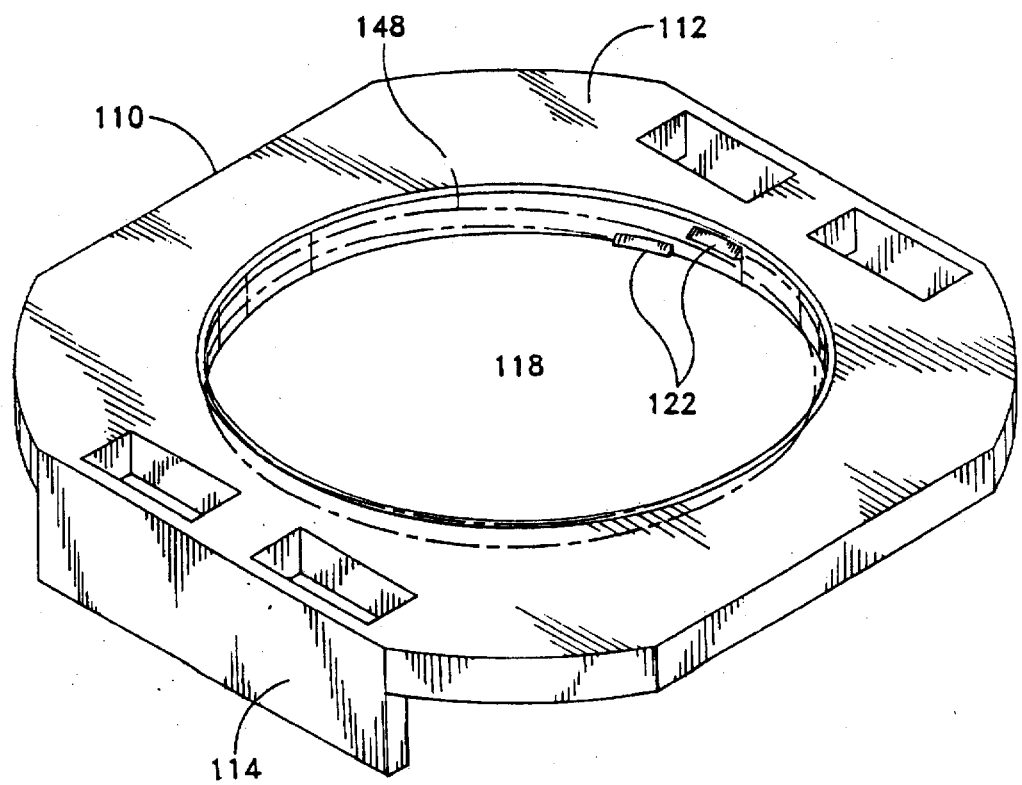
FIG. 9 is a perspective view of the article shown in FIG. 7 and manufactured pursuant to the present invention showing the helical thread line.

For example, FIGS. 7–9 illustrate such an alternative embodiment where the arrangement of thread segments have been modified. Referring to FIG. 7, molded article 110 includes a planar body 112 with aperture 118 completely therethrough. Inner wall 120 of aperture 118 includes a number of thread segments 122 thereon. Such thread segments, as will be discussed in more detail below, create a female thread pattern for receipt of male threaded shank 124 to assist in the mounting of heatsink member 126 to molded article 110. Additionally, legs 114 are provided for similar purposes as legs 14 shown in FIG. 1.

FIG. 8 illustrates a cross-sectional view through the line 8—8 of FIG. 7 to show thread segments 122 in their helical line pattern 148. FIG. 9, a perspective view of molded article 110, also shows helical line pattern 148 of thread segments 122. FIGS. 8 and 9 illustrate a thread helical line pattern 148 which has two full turns. As a result, alternative thread segments 122 are employed along the path of helical line pattern 148. Similarly, if three complete turns were required, the pattern of thread segments 22 would be modified to provide for every third thread segment 122 to be employed along the helical line pattern 148.

The present invention is capable of providing an interrupted thread pattern completely through an article which can closely simulate a continuous thread pattern which has only previously been able to be made through a separate tooling process. As can be seen, the unique mold construction of the present invention includes two halves which is capable of forming interrupted thread segments very close to one another to closely simulate a continuous thread. Unlike known interrupted thread articles and mold constructions for manufacturing such articles, the present invention enables a threaded connection which is extremely reliable and not subject to buckling or creep in high temperature environments. In addition, the threaded article and mold construction of the present invention permits certain creep resistant and high temperature resistant plastics to be employed in the aforementioned new applications.

It would be appreciated by those skilled in the art that various changes and modifications can be made to the illustrated embodiments without departing from the spirit of the present invention. All such modifications and changes are intended to be covered by the appended claims.

What is claimed is:

1. A molded article having interior threads, for securing a threaded heat sink having a bottom contact surface and a longitudinal axis perpendicular thereto, to a heat generating member having a top planar surface, comprising:

a molded article having an aperture therethrough; said aperture defined by a cylindrical inner wall having an inner wall surface and a central axis; said article being manufactured of plastic;

a plurality of thread segments disposed on said inner wall surface in a position substantially perpendicular to said central axis; said thread segments describing a helical thread pattern of greater than one turn; each of said thread segments being positioned at a height different from one another on said inner wall surface of said aperture; none of said thread segments vertically overlapping one another, in the direction of said central axis, about the periphery of said inner wall of said aperture;

means connected to said molded article for securing said molded article to said heat generating member; and means for threadably receiving the threaded heat sink member through said aperture and into heat transfer communication with said heat generating member; said contact surface of said heat sink being flush with said top planar surface of said heat generating member; said longitudinal axis being perpendicular to said top planar surface of said heat generating member.

2. The molded article of claim 1, wherein said helical thread pattern is described by alternating thread segments about the periphery of said inner wall.

3. The molded article of claim 1, wherein said helical thread pattern is described by every other third thread segment about the periphery of said inner wall.

* * * * *